(12) United States Patent
Feistel

(10) Patent No.: US 6,322,080 B1
(45) Date of Patent: *Nov. 27, 2001

(54) SEALING ARRANGEMENT

(75) Inventor: Norbert Feistel, Winterthur (CH)

(73) Assignee: Maschinenfabrik Sulzer-Burckhardt AG, Basel (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,174
(22) PCT Filed: Jun. 4, 1996
(86) PCT No.: PCT/CH96/00215
   § 371 Date: Dec. 12, 1997
   § 102(e) Date: Dec. 12, 1997
(87) PCT Pub. No.: WO97/00396
   PCT Pub. Date: Jan. 3, 1997

(30) Foreign Application Priority Data

Jun. 14, 1995 (EP) .................................................. 95810401

(51) Int. Cl.$^7$ ....................................................... F16J 9/20
(52) U.S. Cl. .......................... 277/490; 277/435; 277/437
(58) Field of Search ................................... 277/435, 447, 277/448, 489, 491, 492, 493, 490, 908, 909, 434

(56) References Cited

U.S. PATENT DOCUMENTS

| | | | |
|---|---|---|---|
| 1,369,075 | * | 2/1921 | Ballman . |
| 1,391,845 | | 9/1921 | Moratta . |
| 1,488,052 | * | 3/1924 | McFarlane . |
| 1,538,107 | * | 5/1925 | Giller . |
| 2,064,527 | * | 12/1936 | Ericsson ................................. 277/36 |
| 3,057,630 | * | 9/1962 | Snned ................................... 277/165 |
| 3,305,241 | * | 2/1967 | Hart ...................................... 277/489 |
| 3,942,806 | * | 3/1976 | Edlund ................................. 277/165 |

FOREIGN PATENT DOCUMENTS

| | | |
|---|---|---|
| 439 897 | 12/1967 | (CH) . |
| 7318583 | 7/1975 | (DE) . |
| 4201246C2 | 12/1993 | (DE) . |
| 2 678 039 | 12/1992 | (FR) . |
| 278564 | 10/1927 | (GB) . |

* cited by examiner

Primary Examiner—Chuck Y. Mah
Assistant Examiner—Enodi Peavey
(74) Attorney, Agent, or Firm—Townsend and Townsend and Crew LLP

(57) ABSTRACT

Sealing arrangement for a piston rod with a circular cross-section, comprising a one-piece sealing ring with a parting joint and compensation clearance as well as a cover ring surrounding the sealing ring in the peripheral direction, with the sealing ring having a section which extends in the peripheral direction of the sealing ring at at one end and forms an overlapping ring joint together with the other end of the sealing ring, and with the sealing ring having a radial wall thickness decreasing towards the parting joint. This arrangement has an excellent sealing action in a direction axial to the arrangement.

13 Claims, 5 Drawing Sheets

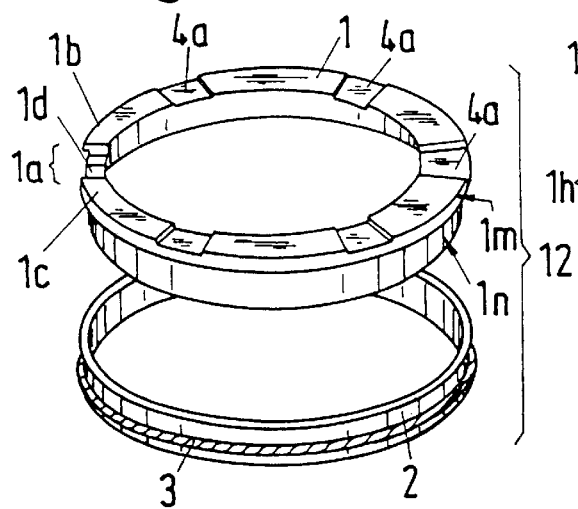
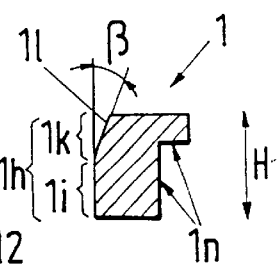
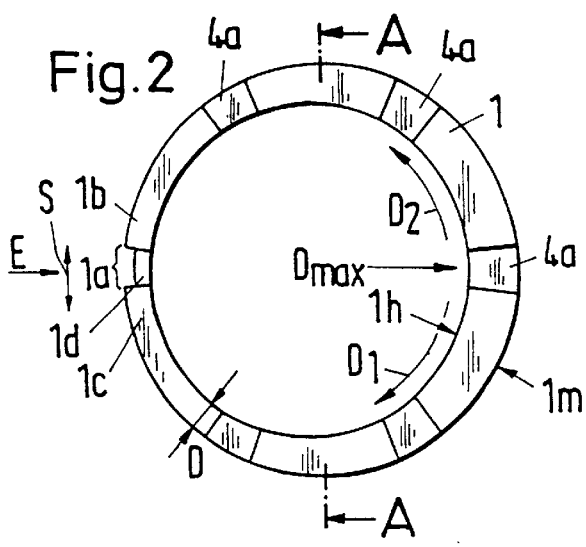
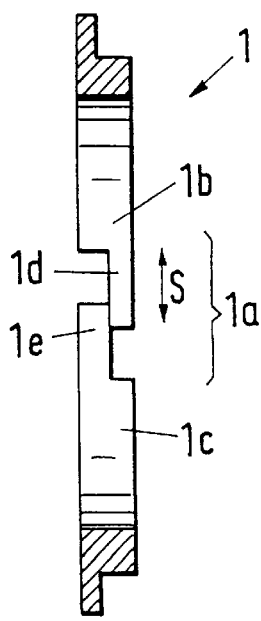
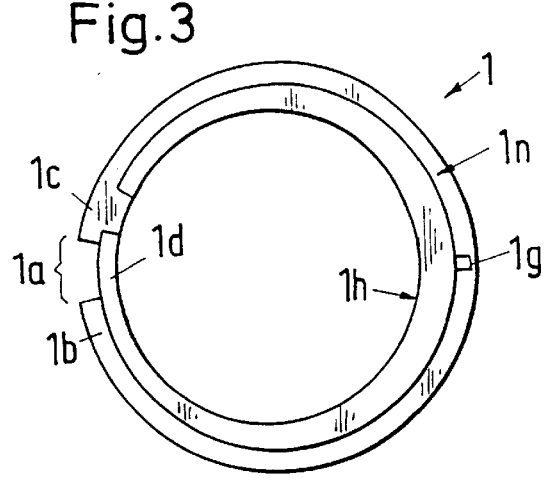
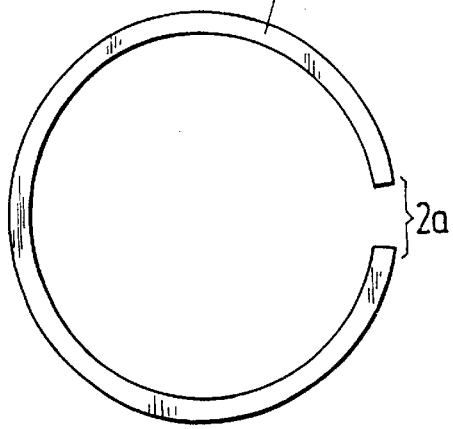

(B-B)

(C-C)

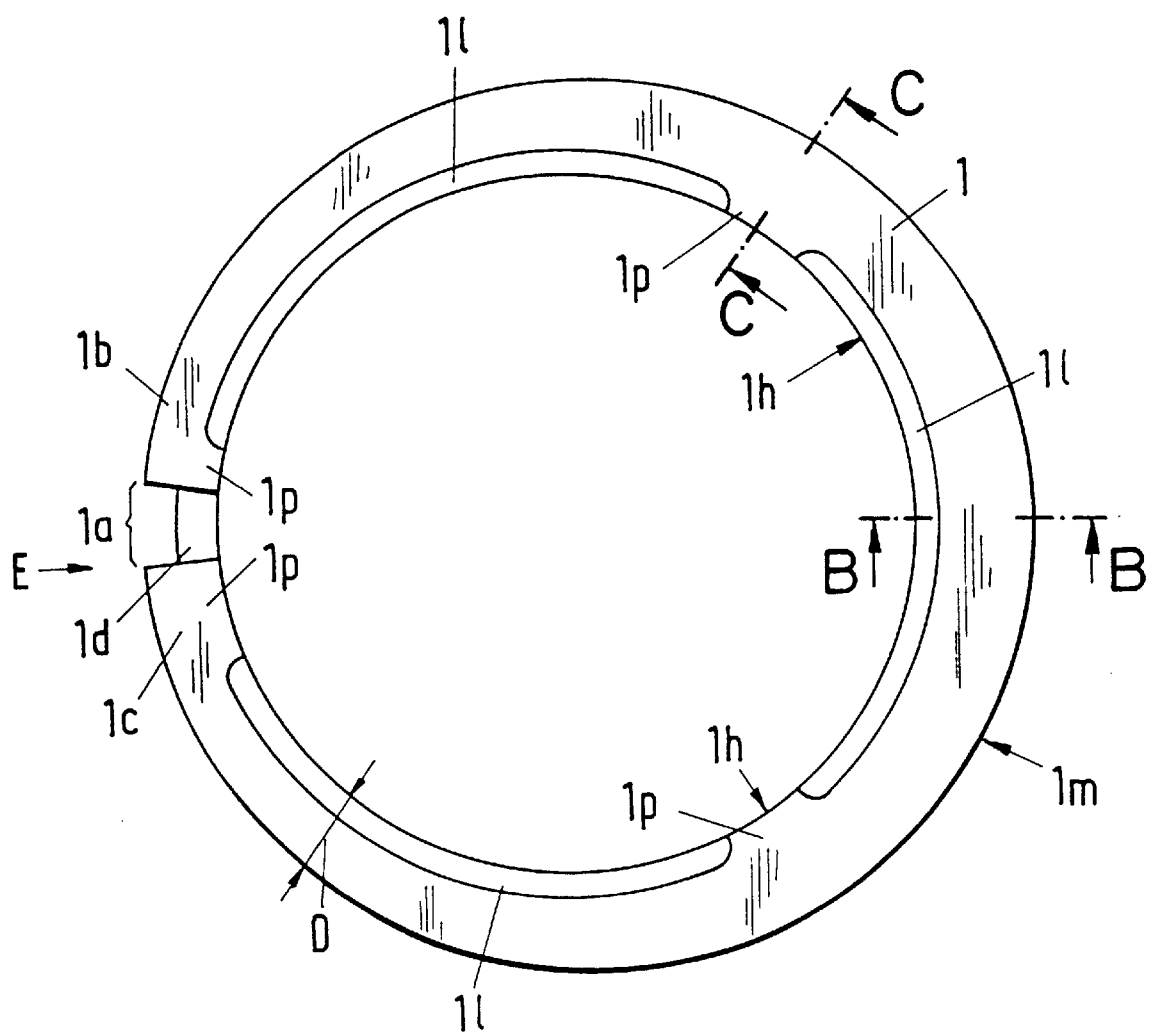

SEALING ARRANGEMENT

BACKGROUND OF THE INVENTION

1. Field of the Invention

The invention relates to a sealing arrangement comprising a one-piece sealing ring with a parting joint and compensating clearance and cover ring surrounding or enclosing the sealing ring in the peripheral direction.

2. Description of the Prior Art

Sealing arrangements for a body of circular cross-section such as a piston rod are known, in particular for piston compressors. Dry running piston compressors are machines which require no foreign lubrication in the compression part. Such compressors have fixed sealing elements past which a piston rod is moved. The seal elements are usually arranged one after the other in series and form in this manner a so-called packing. A packing of this type with sealing arrangements and sealing rings is known from CH 439 897. Sealing rings are subject to wear at the sealing surface which lies against the piston rod. In order to maintain the sealing function over longer periods of time, the known sealing ring has wear compensation wherein the sealing ring is split up into three sealing ring elements with partial joints extending parallel to a tangent with respect to the piston rod and with radial joints forming a compensatory ring gap. A hose spring peripherally surrounding the sealing ring exerts a preload on the sealing ring elements towards the piston rod. This known sealing arrangement has the disadvantage that the sealing ring has a large number of partial joints, which impair the sealing function. In order to seal off these joints, a cover ring lying in contact in the axial direction is arranged adjacent to the sealing ring. Such a sealing arrangement has the disadvantage that it has a relatively long extent in the axial direction. A known problem of such sealing arrangements at piston rods is the frictional heat which arises. Dissipation of the heat of friction via the seal elements themselves is possible only with difficulty, since the seal elements are usually made of plastic and act thermally almost as insulators. The greatest portion of the heat of friction is thus led off in a clearly less efficient manner by the piston rod. The heat of friction which arises is thus largely responsible for high wear, among other things, when sealing rings of plastic are used. Thus, a complicated and expensive cooling of the packing containing the sealing arrangement is often required.

SUMMARY OF THE INVENTION

It is the object of the present invention to overcome the disadvantages of known sealing arrangements.

The sealing arrangement in accordance with the invention for a piston rod with a circular cross-section thus comprises a one-piece sealing ring with a ring gap and compensatory clearance as well as a cover ring surrounding or enclosing the sealing ring in the peripheral direction, with the sealing ring having a section at least at one end which, together with the other end of the sealing ring, forms an overlapping ring gap, and with the sealing ring having a wall thickness decreasing towards the parting joint or ring gap respectively.

An advantage of the sealing arrangement in accordance with the invention is to be seen in that the overlapping ring gap in the axial direction produces a high degree of gastightness. The surrounding or enclosing cover ring assists the sealing action and exerts in addition a bias load acting on the sealing ring towards the piston rod. The surrounding or enclosing cover ring seals the overlapping parting joint in the radial direction.

Suitable materials for the sealing ring are plastics for dry running applications such as filled polymers with a matrix of polytetrafluoroethylene (PTFE) or a mixture of mechanically solid, high-temperature-resistant and wear-resistant polymers, which are also designated as "high-temperature polymers", such as poly(ether ether ketone) (PEEK), poly (ether ketone) (PEK) polyimide (PI), poly(phenylene sulphide) (PPS), polybenzimidazole (PBI), polyamideimide (PAI) or also epoxy resin. The high-temperature polymers are not capable of dry running in their pure form and hence require additional solid lubricants such as carbon, graphite, molybdenum sulphide, PTFE etc. Such high-temperature polymers are then designated as "modified".

An advantage of the sealing arrangement in accordance with the invention is to be seen in the fact that a sealing ring manufactured of a high-temperature polymer can, in particular, be used.

The term "high-temperature" polymer serves as a collective term in connection with the use of sealing elements in piston compressors for plastics which are distinguished from the customary filled PTFE materials by the following properties:

High-temperature polymers have a high mechanical stability even at the high temperatures that are usual in dry running.

High-temperature polymers have no cold flow properties, so even finely shaped sealing rings remain form-stable and, in particular, require no additional support ring when used in a packing even at high pressures.

High-temperature polymers have a substantially higher module of elasticity, which leads to greater stiffness for larger ring diameters of a sealing ring.

With high-temperature polymers, sealing rings can be manufactured which, in comparison with filled PTFE, have substantially smaller diameters and nevertheless a substantially higher mechanical loadability, so that such sealing rings made of high-temperature polymers are suitable, in particular, for use at high compression end pressures.

A previous disadvantage in the use of high-temperature polymers was to be seen in the fact that the poor ability to adopt to a specific shape made it difficult to achieve complete contact of the sealing ring over the entire periphery of a piston rod, so that leaks resulted.

The sealing ring in accordance with the present invention has the advantage that the sealing ring has a radial wall thickness which decreases towards the parting joint or the ring gap respectively, which means that the sealing ring is made somewhat thinner and thus softer in bending in the region of the overlapping ring gap. By virtue of this design, a sealing ring consisting of high-temperature polymers has good shape matching ability.

The sealing ring in accordance with the invention is, in particular, suitable for dry running ring piston compressors, with the sealing ring preferably consisting of a modified high-temperature polymer with so-called self-lubrication properties. A sealing ring of this type can be manufactured as a very narrow ring so that, on the one hand, the piston rod better transmits the heat via radiation heat to the packing and, on the other hand, a smaller frictional surface exists between the sealing ring and the piston rod, which reduces the heating up. In this manner, an excessive heating up of the piston rod can be prevented, which has the additional advantage that the sealing ring is subject to reduced wear.

The sealing arrangement in accordance with the present invention has a high imperviousness so that only slight leakage occurs through the sealing arrangement, and the leakage takes place mainly between the piston rod and the sealing surface of the sealing ring. During this, a gas bearing arises between the piston rod and the sealing surface, which reduces the production of heat and thus, in addition, the heating of the piston rod as well as the wear on the sealing ring.

BRIEF DESCRIPTION OF THE DRAWINGS

FIG. 1 is a perspective view of a sealing arrangement;

FIG. 2 is a plan view of a sealing ring;

FIG. 3 is a bottom view of the sealing ring;

FIG. 4 is a cross-section through the sealing ring;

FIG. 5 is a further cross-section through a sealing ring and

FIG. 6 is a plan view of a cover ring;

FIG. 7 is a plan view of a further exemplary embodiment of a sealing ring;

DETAILED DESCRIPTION OF THE PREFERRED EXEMPLARY EMBODIMENTS

Figure 4A:
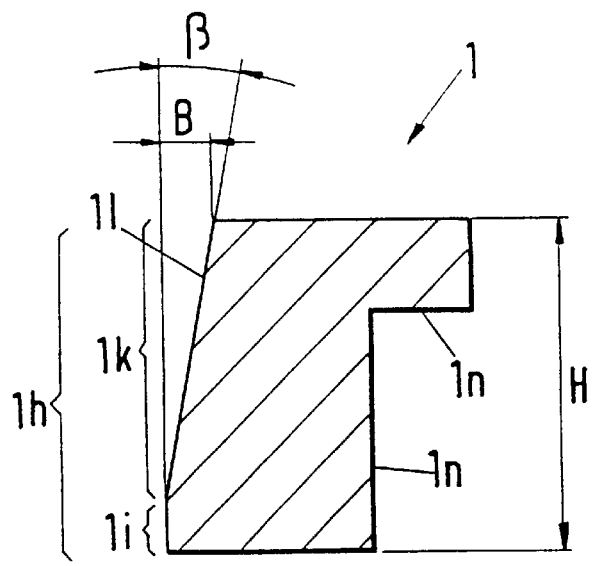
FIG. 4a is a further cross-section through a sealing ring along the line (B—B)

FIG. 1 shows an exploded view of a sealing arrangement 12 consisting of a sealing ring 1, a cover ring 2 placed on the sealing ring 1 in the direction of its periphery, as well as a hose spring or toroidal spring 3 surrounding the cover ring 2 in the direction of its periphery. The plan view of the sealing ring 1 shown in FIG. 2 has a surface 1h extending in the form of a circle along the inner circle that faces the body to be sealed, a piston rod 4, and performs a sealing function. The sealing ring 1 is executed as a one-piece ring with a parting joint 1a so that the sealing ring runs out into two ends 1b, 1c. The end 1c is executed in such a manner that it has, as evident from the bottom view in FIG. 3, a section 1d extending in the peripheral direction of the sealing ring 1, which together with the other end 1b forms a ring gap overlapping in the peripheral direction. The sealing ring 1 has elastic properties so that it has a clearance S in the region of the parting joint 1a. In the present exemplary embodiment, the sealing ring 1 is executed in such a manner that its radial wall thickness D continually decreases towards the parting joint 1a beginning at the position Dmax opposite the parting joint 1a, that is, in the direction D1 or D2. In this manner, even a sealing ring which is manufactured of a material with a higher modulus of elasticity, such as a high-temperature polymer for example, has a behavior which becomes increasingly more elastic and/or softer in bending towards the parting joint 1a. The cover ring 2 with a hose spring 3 surrounding the sealing ring 1 exerts a force on the sealing ring 1 acting towards the piston rod. The cover ring 2 is executed as an open ring. By virtue of the clearance S at the parting joint 1a, as well as the elastic behavior towards the parting joint 1a, the sealing ring 1 has a good ability to adapt to the shape of the piston rod 4 so that the sealing ring 1 sealingly surrounds the piston rod 4 over its entire periphery. The sealing ring 1 has a surface 1m, 1n facing outwards and extending in the form of a circle. In the exemplary embodiment, the profiles of the two surfaces 1h, 1m are mutually arranged in such a manner that they extend eccentric to one another. The sealing ring 1 has five back-flow grooves 4a or pressure relief grooves 4a extending in the radial direction. These pressure relief grooves 4a enable (e.g. FIG. 8) a gas enclosed in the packing ring chamber 14 to flow back into the cylinder during an intake stroke of the cylinder so that a doubly acting sealing function of the sealing element 1, i.e., a sealing function both during the intake phase as well as during the compression phase of the cylinder, is prevented. It is also possible to execute a sealing ring 1 without back-flow grooves 4a. Instead, back-flow grooves 4a can be milled into the metallic base of the chamber ring 5, for example.

FIG. 6 shows an exemplary embodiment of an open cover ring 2 which has a sector-shaped cut-out 2a. The sealing ring 1 has a cylinder-shaped, projecting holding means 1g which comes to lie in the cut-out 2a when the cover ring 2 is placed onto the sealing ring 1, so that the cover ring 2 is secured against rotation in the peripheral direction of the sealing arrangement 12.

Figure 7A:
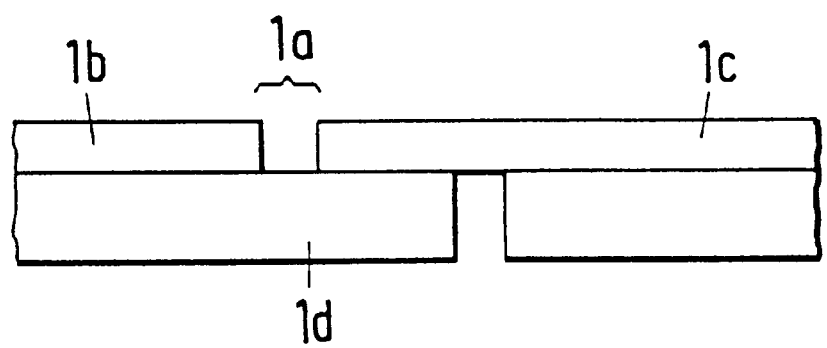
FIG. 7a is a side view of the sealing ring of FIG. 2 from the direction E.

FIG. 7a shows a side view of the sealing ring of FIG. 2 from the direction E. The ring joint of the sealing ring has the two ends 1b, 1c, with the end 1b having the end section 1d extending in the peripheral direction, so that a ring gap overlapping in the peripheral direction results.

FIG. 5 shows a section through a sealing ring 1 along the line (A—A) in FIG. 2, with the parting joint 1a being executed differently in comparison with the execution in accordance with FIGS. 1 to 3. At each end 1b, 1c of the sealing ring 1, end sections 1d, 1e are placed extending in the peripheral direction of the sealing ring 1 which overlap in the peripheral direction and, in this manner, form an overlapping ring joint. The parting joint 1a again has a clearance S. The side view 7b of t he sealing ring 1 corresponds to an embodiment in accordance with FIG. 5 when viewed from the direction E. The sealing ring 1 runs out into the two ends 1b, 1c which have end sections 1d, 1e overlapping in the peripheral direction. Between the ends 1b, 1c there results an intermediate space of width S1 and S2, respectively. In a preferred embodiment, the two widths S1, S2 are made equally large so that the sealing ring 1 has a clearance S=Si=S2 in the peripheral direction. The cover ring 2 comes to lie in the recess 1n, with the recess 1n being made so wide that the recess 1n also extends over the end section 1e in the peripheral direction so that the cover ring 2 encloses the end section 1e in the region of the recess 1n. A sealing arrangement 12 of this kind has a high sealing action since the cover ring 2 encloses the intermediate space with the width S1, as well as the gap between the end sections 1d, 1e, which results in a high imperviousness in the radial direction. In addition, a mutual relative movement of the two end sections 1d, 1e in the radial direction is prevented.

FIG. 4 shows a section through a sealing ring 1 along the line A—A in FIG. 2 with a further possibility for the design of the cross-section. The sealing ring 1 has a surface 1h oriented towards a sliding surface of a piston rod 4. This surface 1h has a height H in the axial direction and is designed to extend cylindrically over a part 1i in order to form a sealing surface 1i and is designed to diverge along a further part 1k. The diverging surface 1l can be executed e.g. to be conically divergent at an angle β.

The sealing arrangement 12 in accordance with the present invention, has an excellent sealing effect since a flow-through is prevented both in the axial and in the radial direction. In this manner, gas constituents escape mainly between the sealing surface 1*i* and the sliding surface of the piston rod 4, which has the advantage that the sealing ring 1 can easily be lifted off from the sliding surface and the friction is thus reduced. The divergent surface 1*l* has the effect that the gas constituents flow unimpeded in the direction towards the reduced sealing surface 1*i*, with the gas constituents exerting a force on the sealing ring 1 which acts outwardly in the radial direction both on the surface 1*l* as well as on the surface 1*i*. In this manner, a leakage between the sealing surface 1*i* and the sliding surface of a piston rod 4 is facilitated, whereby a gas bearing arises between the sealing ring 1 and the piston rod 4. The sealing surface 1*i* can be made relatively narrow in its axial extent in order to produce a pronounced gas bearing. In this manner, the friction between the sealing surface 1*i* and the piston rod 4 can be reduced, which has the advantage that both the heating up of and the wear on the sealing ring 1 are reduced. The sealing ring 1 has a recess 1*n* for receiving the cover ring 2. This recess 1*n* can also be executed in a different manner, or it may be absent.

Figure 8:
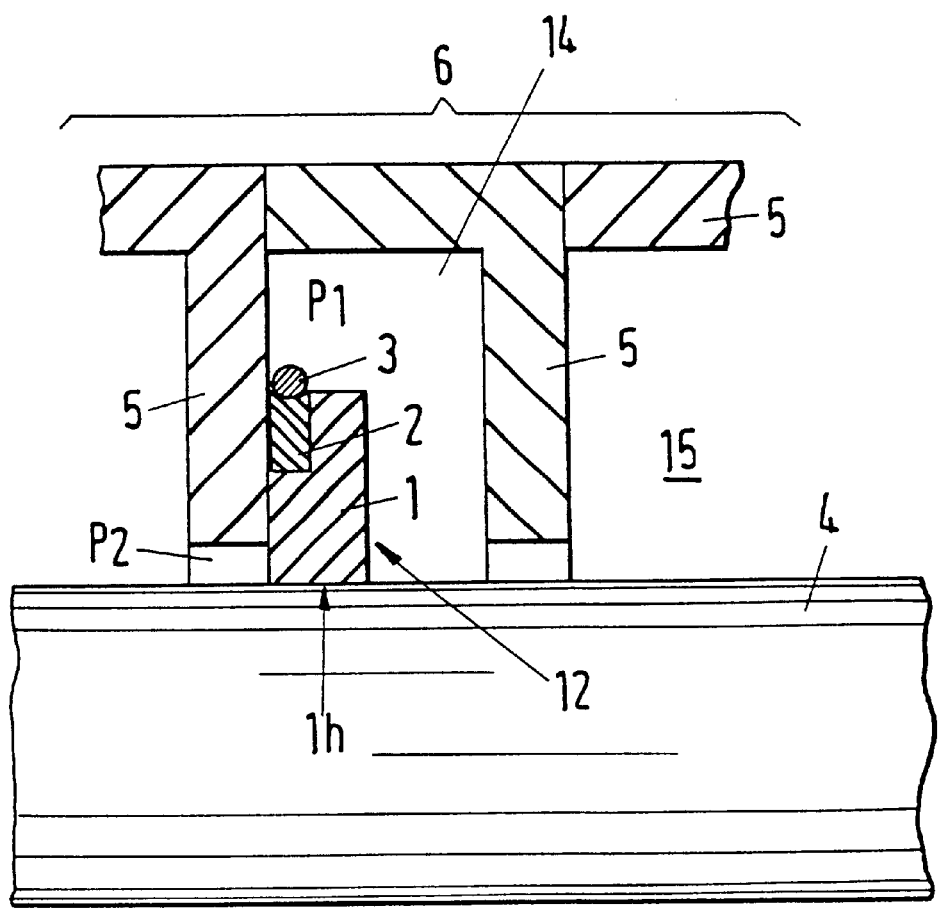
FIG. 8 is a longitudinal view through a dry running sealing arrangement.

FIG. 8 shows a longitudinal section through a dry running sealing arrangement or a so-called packing 6. To this belongs at least one sealing chamber 14 which surrounds the piston rod 4 and is formed of two chamber rings 5, and which is sealingly screwed to the associated cylinder space 15. A two-part sealing ring disk 12 comprising a sealing ring 1, as well as a cover ring 2, is placed in the sealing chamber 14. In addition, a hose spring 3 surrounds the cover ring 2. As a result of the sealing function of the ring 1, the pressure P1 in the compression chamber 14 is greater than the pressure P2 in the passage opening to the following compression chamber 14.

Figure 4B:
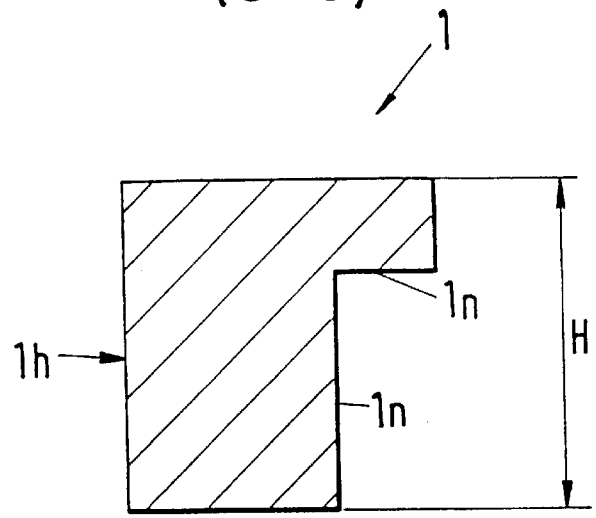
FIG. 4b is a further cross-section through the sealing ring of FIG. 4a along the line (C—C)
Figure 7B:
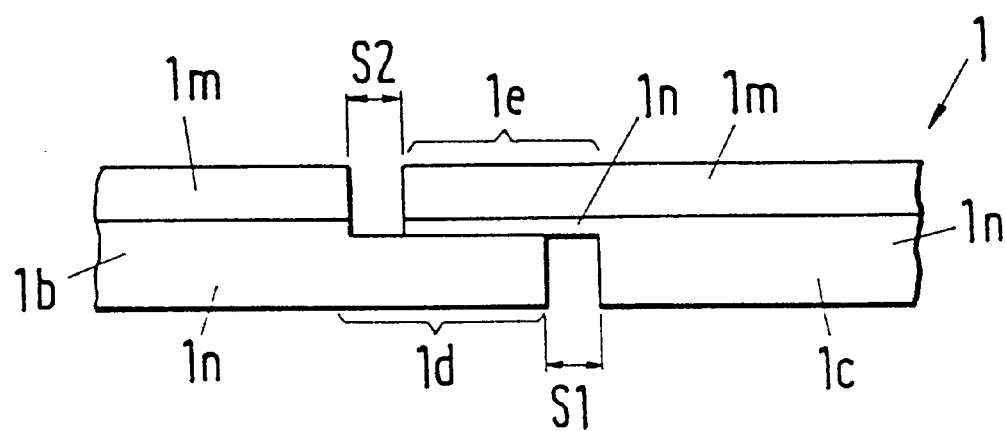
FIG. 7b is a side view of the sealing ring of FIG. 7 from the direction E.

In distinction to the embodiment of FIG. 2, the exemplary embodiment of a sealing ring 1 illustrated in FIG. 7 has a surface 1*h* with a cone-shaped partial surface 1*l*. The partial surface 1*l* is interrupted at three places by a web 1*p*. It can also prove advantageous to arrange more than three webs 1*p* distributed about the periphery. FIG. 4*a* shows a section through the sealing ring 1 along the line B—B and shows the cone-shaped partial surface 1*l*, which extends in the axial direction over a width 1*k*, as well as the cylindrically extending partial surface 1*i*. The partial surface 1*l* extending in a cone shape intersects the surface of the piston rod 4 at an angle β. FIG. 4*b* shows a section through a web 1*p* of the sealing ring 1 along the line C—C. A web 1*p* is executed in such a manner that the inner surface 1*h* has a width in the axial direction corresponding to the width H of the sealing ring 1 and extends parallel to the piston rod 4. A web 1*p* lies in contact with the piston rod 4 over the entire width H and serves to stabalize the sealing ring 1. The exemplary embodiment in accordance with FIG. 7 has three webs 1*p* arranged so that they are distributed over the periphery of the surface 1*h*, with a web 1*p* being placed in the region of the parting joint 1*a*. A sealing ring 1*b* can naturally also be executed without webs 1*p* so that the conical partial surface 1*l* extends over the entire periphery of the surface 1*h* without interruption.

The conically extending partial surface 1*l* has a maximum distance B to the piston rod 4 in accordance with FIG. 4*a*. In an embodiment of the sealing ring 1, the clearance S is made so wide that it has a width of "2 times pi times B". A sealing ring 1 executed in this manner forms a friction ring in a first phase of operation and a flow ring in a second phase of operation, in the first phase of operation the sealing ring 1 has a conically extending partial surface 1*l*. With increasing wear at the sealing surface 1*i* the conically extending partial surface 1*l* is diminished until the sealing surface 1*i* extends over the entire width H. If the clearance S is made to correspond to a width of "2 times pi times B", then the clearance becomes zero as soon as the partial area 1*l* is completely abraded away. In this state, the sealing ring 1 becomes a flow ring because, since the play amounts to zero, hardly any further wear of the sealing surface 1*i* results so that the sealing ring 1 has an approximately constant leakage during the second phase of operation. The sealing ring 1 thus has a maximum flow resistance during the second phase of operation.

The partial surface 1*l* cannot only be executed to diverge conically, but can take on any arbitrary shape in such a manner that a spacing arises in the region of the partial surface 1*l* between piston rod 4 and the sealing ring 1.

What is claimed is:

1. A sealing arrangement for a piston rod with a circular cross-section, comprising a one-piece sealing ring with a parting joint and compensation clearance as well as a cover ring surrounding or enclosing the sealing ring in the peripheral direction, with the sealing ring having a section which extends in the peripheral direction of the sealing ring at least at one end and forms an overlapping ring joint together with another end of the sealing ring, and with the sealing ring having a radial wall thickness which decreases towards the parting joint;

wherein the sealing ring has at its radially outer surface a recess extending along the circumference of the sealing ring, the cover ring fitting in the recess and a sealing surface which is a radially inner surface of the sealing ring.

2. A sealing arrangement in accordance with claim 1 wherein the sealing ring has a circularly extending surface oriented radially inwardly towards a body to be sealed; and wherein the sealing ring has a surface at its radially outer side extending circularly in the peripheral direction of the sealing ring and eccentric to the circularly extending surface.

3. A sealing arrangement in accordance with claim 1 wherein the sealing ring has a securing means in order to prevent a mutual rotation of the sealing ring and the cover ring.

4. A sealing arrangement in accordance with claim 1 wherein the cover ring has elastically resilient properties and surrounded by a spring lying on the cover ring and extending in the peripheral direction of the sealing ring.

5. A sealing arrangement in accordance with claim 1 wherein the sealing ring has a surface oriented radially inwardly towards a body to be sealed; wherein the surface has a height in a direction extending perpendicular to the peripheral direction of the sealing ring; wherein the surface is of cylindrical shape over a portion of the height in order to form a sealing surface and has a surface with a radius enlarged with respect to the sealing surface over a further part.

6. A sealing arrangement in accordance with claim 5 wherein the surface is made conically divergent.

7. A sealing arrangement in accordance with claim 5 wherein the surface diverges in the radial direction by a maximum distance B; and wherein the compensatory clearance has a width of times pi times B.

8. A sealing arrangement in accordance with claim 5 wherein a plurality of webs are arranged distributed along an inner surface in the peripheral direction.

9. A sealing arrangement in accordance with claim 1 wherein the sealing ring is manufactured of one of a plastic or a modified high temperature polymer.

10. A sealing arrangement in accordance with claim 9 wherein the sealing ring is manufactured of one of polytetrafluoroethylene (PTFE), poly(ether ether ketone) (PEEK), poly(ether ketone) (PEK), polyimide (PI), poly(phenylene sulphide) (PPS), polybenzimidazole (PBI), or polyamideimide (PAI).

11. A sealing arrangement in accordance with claim 1 wherein the covering is surrounded by a spring lying on the cover ring and extending in the peripheral direction of the sealing ring.

12. A packing for sealing a piston rod with sealing arrangements that comprise:

a one-piece sealing ring with a parting joint and compensation clearance as well as a cover ring surrounding or enclosing the sealing ring in the peripheral direction, with the sealing ring having a section which extends in the peripheral direction of the sealing ring at least at one end and forms an overlapping ring joint together with another end of the sealing ring, and with the sealing ring having a radial wall thickness which decreases towards the parting joint wherein the sealing ring has at its radially outer surface a recess extending along the circumference of the sealing ring, the cover ring fitting in the recess.

13. A piston compressor with a sealing arrangement comprising:

a packing for sealing a piston rod with sealing arrangements that comprise:

a one-piece sealing ring with a parting joint and compensation clearance as well as a cover ring surrounding or enclosing the sealing ring in the peripheral direction, with the sealing ring having a section which extends in the peripheral direction of the sealing ring at least at one end and forms an overlapping ring joint together with another end of the sealing ring, and with the sealing ring having a radial wall thickness which decreases towards the parting joint wherein the sealing ring has at its radially outer surface a recess extending along the circumference of the sealing ring, the cover ring fitting in the recess.

* * * * *